(12) United States Patent
Saito et al.

(10) Patent No.: US 7,025,702 B2
(45) Date of Patent: Apr. 11, 2006

(54) DIFFERENTIAL

(75) Inventors: Masahiro Saito, Hagagun (JP);
Kunihiro Osawa, Hagagun (JP);
Toshihiko Kasai, Hagagun (JP)

(73) Assignee: Yanagawa Seiki Co., Ltd., Tokyo (JP)

( * ) Notice: Subject to any disclaimer, the term of this patent is extended or adjusted under 35 U.S.C. 154(b) by 38 days.

(21) Appl. No.: 10/741,007

(22) Filed: Dec. 19, 2003

(65) Prior Publication Data

US 2004/0157696 A1    Aug. 12, 2004

(30) Foreign Application Priority Data

Dec. 24, 2002 (JP) .............................. 2000-371868
Dec. 24, 2002 (JP) .............................. 2002-371869
Dec. 24, 2002 (JP) .............................. 2002-371870

(51) Int. Cl.
*F16H 57/04* (2006.01)
(52) U.S. Cl. ...................................................... 475/160
(58) Field of Classification Search ................ 475/230, 475/160
See application file for complete search history.

(56) References Cited

U.S. PATENT DOCUMENTS

| 1,987,716 A | * | 1/1935 | Skelton | 475/246 |
| 4,163,400 A | * | 8/1979 | Fisher et al. | 475/230 |
| 4,513,635 A | * | 4/1985 | Takimura et al. | 475/230 |
| 4,722,244 A | * | 2/1988 | Tsuchiya et al. | 475/230 |
| 6,743,138 B1 | * | 6/2004 | Krzesicki et al. | 475/230 |

* cited by examiner

*Primary Examiner*—Dirk Wright
(74) *Attorney, Agent, or Firm*—Koda & Androlia

(57) ABSTRACT

A differential capable of satisfying a demand for an improvement in performance and a reduction in cost in which the pinion shaft 19 is movably disposed in the differential case 2, and sliding bearings 16, 41, 42 are disposed between mutually opposite surfaces of the pair of side gears 13 and the differential case 2 and between mutually opposite surfaces of the pinions 12 and the differential case 2, respectively.

2 Claims, 9 Drawing Sheets

DIFFERENTIAL

BACKGROUND OF THE INVENTION

1. Field of the Invention

The present invention relates to a differential that transmits a driving force of an energy conversion machine, such as an engine or a motor, to a wheel driving shaft.

2. Description of the Related Art

Conventionally, a three-wheeled or four-wheeled vehicle uses a driving-force transmission apparatus in which the driving force of an energy conversion machine, such as an engine or a motor, is controlled while being supplied to a transmission, this controlled driving force is then supplied from an output shaft of the transmission to a differential through a propeller shaft when necessary, and the driving force of the energy conversion machine is transmitted through the differential to a wheel driving shaft. For example, in an FF type driving-force transmission apparatus, the differential of the driving-force transmission apparatus is rotatably disposed in a mission case of a transmission used as a housing through a bearing.

A 4-pinion type differential having four pinions has been proposed as the differential of the driving-force transmission apparatus, for example, because a high load imposed on pinions, which results from the fact that the energy conversion machine has been designed to output a higher driving force in recent years, can be dispersed to reduce a load assigned to one of the pinions.

Additionally, in recent years, a differential having a closed differential case has been proposed, for example, because it is possible to easily reduce a noise caused by an outward leak of a sound emitting from a sliding portion formed in the differential case, such as an operational noise of a differential gear made up of a pinion and a side gear.

Therefore, a proposal has been made for a differential that is rotatably held on a pinion shaft formed by cross-shaped four pinions in a closed differential case.

The following two kinds of differentials can be mentioned as the conventional 4-pinion type differential that uses a closed differential case.

A first conventional differential is structured to be rotatably held on a pinion shaft integrally formed with cross-shaped four pinions in a closed differential case.

A second conventional differential is structured to rotatably support four pinions 105 by arranging a long pinion shaft 102 and two short pinion shafts 103 and 104 like a cross in a case 101 of a differential 100, as shown in FIG. 1.

In the thus structured differential 100, a case 101 has four through-holes 106 in four directions, i.e., in upward, downward, leftward, and rightward directions centering on its rotational axis center RL, as shown in FIG. 1. These through-holes 106 are equi-angularly spaced from each other at angles of 90 degrees centering on the rotational axis center RL of the case 101 so that the distance between the adjoining ones becomes equal. The pinion shafts 102, 103, and 104 are fitted to the through-holes 106, respectively, from the outside of the case 101. These pinion shafts 102, 103, and 104 are fixed to the case 101 by a fixing pin 107 fitted and fixed to the case 101.

In greater detail, the long pinion shaft 102 has its both ends fitted to the through-hole 106, and, at a part forming the through-hole 106 on the side of the upper end of the case 101 shown at the upper part of FIG. 1, the fixing pin 107 fitted to the case 101 can prevent the long pinion shaft 102 from rotating upon the axis center. Furthermore, the short pinion shaft 103 shown on the left of FIG. 1 has its left end fitted to the through-hole 106 and has its right end positioned on the side of the rotational axis center RL of the case 101. At a part forming the through-hole 106 on the side of the left end of the case of FIG. 1, the fixing pin 107 fitted to the case 101 can prevent the short pinion shaft 103 from rotating upon the axis center. Furthermore, the short pinion shaft 104 shown on the right of FIG. 1 has its right end fitted to the through-hole 106 and has its left end positioned on the side of the rotational axis center RL of the case 101. At a part forming the through-hole 106 of the right end part of the case of FIG. 1, the fixing pin 107 fitted to the case 101 can prevent the short pinion shaft 104 from rotating upon the axis center.

A supporting ring 108 is provided in the case 101. The long pinion shaft 102 is disposed to radially pass through the center of the supporting ring 108. The supporting ring 108 supports the ends of the two short pinion shafts 103 and 104 situated on the side of the rotational axis center RL of the case 101.

A cross-shaped pinion shaft unit 109 is made up of the three pinion shafts 102, 103, and 104, the three fixing pins 107, and the supporting ring 108. This pinion shaft unit 109 is shown in FIG. 2.

For example, in an FF type driving-force transmission apparatus, the differential of the driving-force transmission apparatus is rotatably disposed through a bearing in the mission case of the transmission used as a housing. When a closed differential case is used, a lubrication structure is formed so that a lubricant supplied to a sliding portion formed in the transmission can be supplied to a sliding portion formed in the differential case through a small gap formed between the surface of the differential case and the surface of the wheel driving shaft facing the surface of the differential case by forced lubrication that uses an oil pump driven by a driving force of the driving-force transmission apparatus or by splash lubrication that uses splashes of a lubricant.

However, in the conventional differential, although a lubricant can be supplied into the closed differential case, the quantity of the lubricant supplied thereinto is small, and it is insufficient to prevent all of the heat and wear of a sliding portion of the differential. Additionally, since the quantity of the lubricant supplied into the differential case is small, the lubricant will deteriorate in a relatively short time. As a result, disadvantageously, a stable function cannot be maintained for a long time.

In order to settle this problem, a proposal has been made for a differential that has a lubricant supply means provided with a lubricant supply hole through which, when the differential case is rotated, a lubricant is guided from the outside of the differential case into the differential case in the outer peripheral surface of a closed differential case and that can forcedly lubricate the interior of the differential case with a part of the lubricant used for lubrication of a sliding portion of the transmission by the lubricant supply means when the differential case is rotated by forced lubrication that uses an oil pump driven by a driving force of the driving-force transmission apparatus or by splash lubrication that uses splashes of a lubricant.

However, an outstanding problem resides in the fact that the conventional differential cannot satisfy the recent demand for high performance and cost reductions.

For example, current vehicles are required to be superior in performance, and, accordingly, a differential has been designed to exhibit high performance. In order to achieve a differential having such high performance, an improvement in durability and a reduction in abnormal noises have been demanded by optimizing the engagement between differential gears.

The engagement between differential gears can be optimized by lessening gaps generated by a backlash at the engagement portion between a side gear and a pinion as much as possible and then evening out the gaps.

However, disadvantageously, in the conventional differential, it is difficult to evening out gaps between surfaces facing each other at the engagement portion between the side gear and the pinion, and a gap for a backlash must be enlarged.

Additionally, in the conventional differential, it is difficult to evening out a gap between mutually opposite surfaces of the side gear to which a wheel driving shaft is attached and the differential case. In greater detail, a gap is formed between a back surface of the side gear and an inner surface of the differential case that faces the back surface thereof, and therefore gaps in the axial direction of a pair of wheel driving shafts connected to the side gear have differed. As a result, disadvantageously, the movement amount in the axial direction of the pair of wheel driving shafts become different, and rickety movements of wheels and tires do not become even for the right and left, consequently lowering its commercial value.

These problems prominently arise when the pinion shaft is positioned and fixed to the differential case with high accuracy.

The aforementioned gaps can, of course, be theoretically evened out. However, to do so, constituent elements of the differential must be constructed with even higher accuracy, and many man-hours are required for their assembly. However, this cannot satisfy the demand for cost reductions in recent years, and is unrealistic.

Therefore, a demand has been made for a differential capable of easily and reliably evening out gaps between mutually opposite surfaces at the engagement portion among a side gear and three or more pinions and capable of achieving an improvement in durability and a reduction in abnormal noises by optimizing the engagement of differential gears.

Additionally, in recent years, various devices of a vehicle have been required to be reduced in cost. A differential is mentioned as one of the devices to be reduced in cost. However, the first conventional differential of the 4-pinion type that uses a closed differential case has a problem in the fact that many processing steps are necessitated to form a cross-shaped pinion shaft while spending many man-hours, thus making it impossible to satisfy the demand for cost reductions.

Likewise, the second conventional differential 100 has a problem in the fact that there are a great many components and a significant number of assembly steps, thus making it impossible to satisfy the demand for cost reductions.

In the lubrication structure in which forced lubrication of the interior of the closed differential case is performed by the lubricant supply means when the differential case used in the conventional differential is rotated, the sliding portion can be excellently lubricated by supplying a lubricant to the interior of the differential case by use of the lubricant supply means when the differential case is rotated, i.e., when a vehicle is traveling. However, a lubricant is not supplied to the interior of the differential case when the differential case stops rotating, i.e., when the vehicle stops traveling. Therefore, a problem resides in the fact that, when the vehicle is started, the quantity of a lubricant to be supplied is small, and the possibility that excellent lubrication cannot be obtained arises.

In other words, in general, when the vehicle is started, a lubricant is supplied to the sliding portion formed in the mission case, for example, through an oil pump rotated and driven by a driving force of the driving-force transmission apparatus, and a part of the lubricant that has passed through the bearing is supplied to the interior of the differential case through the lubricant supply hole of the lubricant supply means. However, in effect, there is a time-lag until the lubricant reaches the interior of the differential case, and, since a rotational speed is low when started, the quantity of a lubricant discharged from the oil pump is small, and therefore the quantity of a lubricant to be supplied to the interior of the differential case is small. Additionally, the quantity of a lubricant reserved in the differential case when the vehicle is traveling depends on a traveling state of the vehicle and other factors.

Therefore, when the vehicle is started, only the lubricant reserved in the differential case when the vehicle was traveling immediately before its start contributes to the lubrication of the differential. When the quantity of the lubricant reserved in the differential case is decreasing, it is insufficient to prevent all of the heat and wear of the sliding portion of the differential, and the sliding portion of the differential is greatly worn down, and the lubricant deteriorates. Especially, when the vehicle curves or turns before a lubricant is supplied to the interior of the differential case, wear-out of the sliding portion and deterioration of the lubricant remarkably appear. If the operation time of the differential gear becomes long at this time, there is a fear that the differential gear will be burned and damaged.

Additionally, the lubrication structure of the conventional differential necessitates an oil pump used to raise the lubricant reserved in the mission case and an oil passage used to guide the lubricant raised by the oil pump to the bearing or a device used to splash the lubricant reserved in the mission case, thus causing the problem of hindering size reductions and cost reductions.

SUMMARY OF THE INVENTION

The present invention has been made in consideration of these circumstances, and it is an object of the present invention to provide a differential capable of satisfying a demand for an improvement in performance and a reduction in cost.

In order to achieve the object, a differential according to a first aspect of the present invention is characterized in that, in the differential in which a plurality of pinions engaged with a pair of side gears are rotatably held on a pinion shaft in a closed differential case that is rotated together with a ring gear by a driving force of an energy conversion machine, the number of the pinions is three or more, and the pinion shaft is movably disposed in the differential case, and sliding bearings are disposed between mutually opposite surfaces of the pair of side gears and the differential case and between mutually opposite surfaces of the pinions and the differential case, respectively. According to this structure, since the pinion shaft is movably disposed in the differential case, the pair of side gears and the three or more pinions can share a backlash equally, and therefore the backlash can be easily minimized. Therefore, an improvement in durability and a reduction in abnormal noises can be easily and infallibly achieved by optimizing the engagement between differential gears. Furthermore, by the sliding bearing, it is possible to lessen the friction of the sliding resistance between the differential case and the side gear and between the differential case and the pinion. Therefore, it is possible to satisfy a demand to improve the performance of the differential.

A differential according to a second aspect of the present invention is characterized in that, in the first aspect, the sliding bearings are spacers. According to this structure, gaps between mutually opposite surfaces at the engagement portion between the pinion and the side gear can be easily and simultaneously adjusted when the assembly is performed.

A differential according to a third aspect of the present invention is characterized in that, in the second aspect, one of the spacers is a shim used to perform a gap adjustment. According to this structure, gaps between mutually opposite surfaces at the engagement portion between the pinion and the side gear can be more easily and simultaneously adjusted when the assembly is performed.

A differential according to a fourth aspect of the present invention is characterized in that, four pinions are rotatably held on a pinion shaft formed by cross-shaped in a closed differential case that is rotated together with a ring gear by a driving force of an energy conversion machine, the pinion shaft has two rod-like straight pinion shafts, and each of the straight pinion shafts has a concave engagement portion in which a direction followed from the outside to the inside is assumed as a depth direction and in which a planar bottom face is provided at its axis center. The concave engagement portion is formed in a direction perpendicular to the axial direction at the center of the axial direction, and the two straight pinion shafts are positioned cross-shaped by disposing the pinion shafts so that the bottom faces of the concave engagement portions of the two straight pinion shafts can face each other. According to this structure, a cross-shaped pinion shaft can be easily formed by the simple operation of disposing the pinion shafts so that the bottom faces of the concave engagement portions of the two straight pinion shafts can face each other. Therefore, it is possible to satisfy a demand to reduce the cost of the differential.

A differential according to a fifth aspect of the present invention is characterized in that, in the fourth aspect, the two straight pinion shafts are identical to each other in shape. According to this structure, the two straight pinion shafts can be used as a common component, and productivity is improved even more.

A differential according to a sixth aspect of the present invention is characterized in that, in the differential in which a differential gear that is rotatably disposed through a bearing and that transmits a driving force of an energy conversion machine, which has been supplied to a ring gear from an output shaft of a transmission, to a wheel driving shaft is provided in a housing, and the differential gear is made up of a plurality of pinions that are disposed in a closed differential case and that are rotated together with the ring gear and a side gear that is disposed in the differential case and that is engaged with each pinion, a reserve portion to reserve a lubricant supplied to the interior of the differential case is formed in the housing, and a plurality of lubricant supply holes that communicate with the inside and the outside of the differential case are formed in the outer peripheral surface of the differential case, and at least a part of the lubrication-side openings of the lubricant supply holes that are situated at a lowest part is formed to face a lubricant reserved in the reserve portion when the differential case stops rotating. According to this structure, a lubricant can be easily and simply supplied to the interior of the differential case with a simple construction when the closed differential case stops rotating. Therefore, it is possible to satisfy a demand to improve the performance of the differential and reduce the cost thereof.

A differential according to a seventh aspect of the present invention is characterized in that, in the sixth aspect, a lubricant catching means for catching a lubricant and guiding the lubrication to the lubrication-side opening of the lubricant supply hole when the differential case is rotated is provided in the vicinity of positions where the plurality of lubricant supply holes of the outer peripheral surface of the differential case are formed. According to this structure, a lubricant can be easily and smoothly supplied to the interior of the differential case when the closed differential case is rotated.

DETAILED DESCRIPTION OF THE PREFERRED EMBODIMENTS

The present invention will be hereinafter described based on embodiments shown in the attached drawings.

First, a first embodiment of a differential according to the present invention will be described with reference to FIG. 3 through FIG. 6.

FIG. 3 through FIG. 6 show the first embodiment of the differential according to the present invention.

Figure 3:
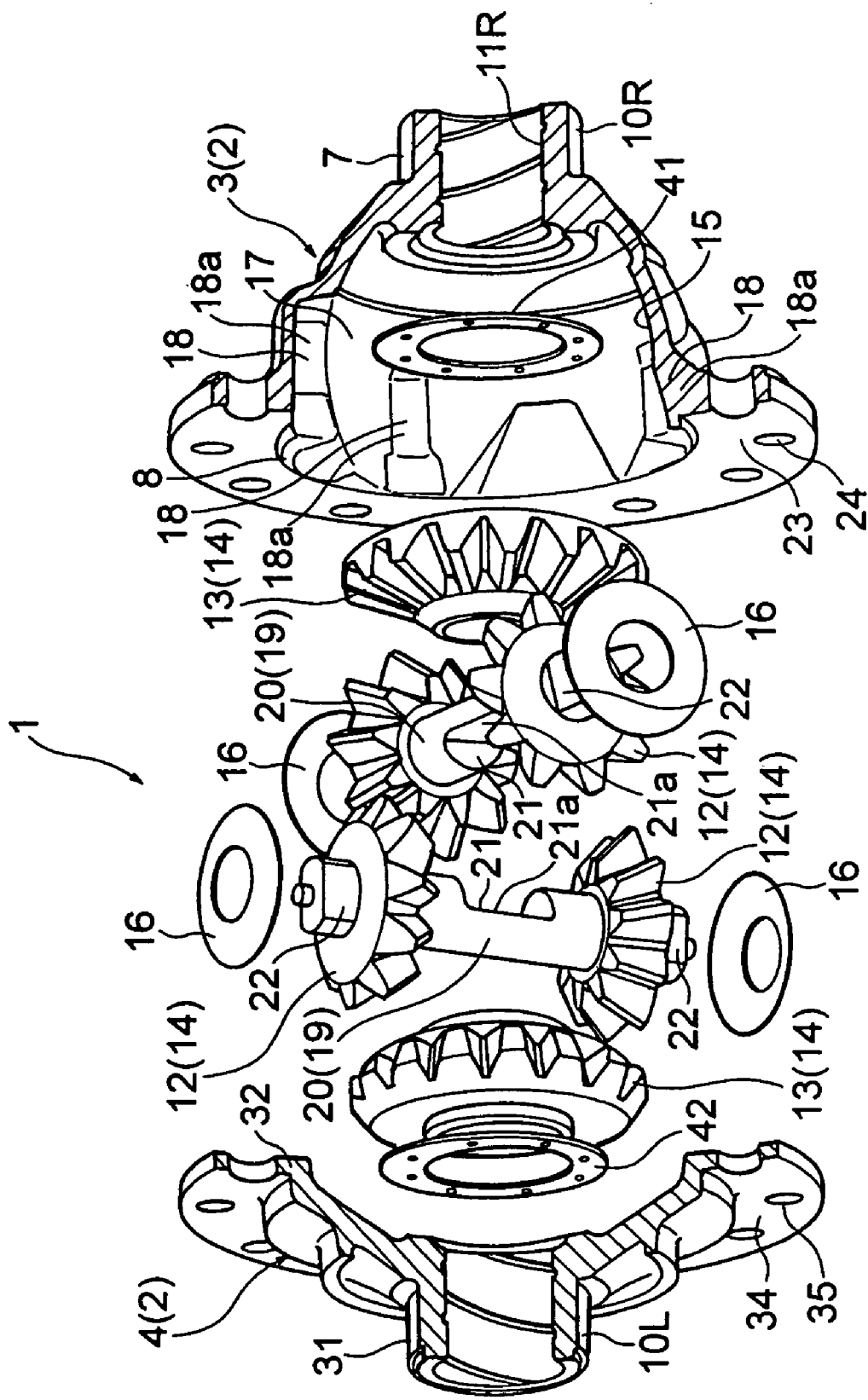
FIG. 3 is a partially cutaway, exploded perspective view of a main part of a first embodiment of the differential according to the present invention.

As shown in FIG. 3, the differential 1 of this embodiment has a differential case 2. The differential case 2 is disposed so that a rotational axis center RL shown in FIG. 4 becomes substantially horizontal when the case 2 is mounted on a vehicle. The differential case 2 can be separated into two parts, i.e., a case 3 shown on the right of FIG. 3 and a cover 4 shown on the left of FIG. 3. That is, the differential case 2 is separated into right and left parts along the rotational axis center RL. The differential case 2 can bring its interior into a closed state by fastening the cover 4 to the case 3 with a fixing bolt 5 shown in FIG. 4.

Figure 4:
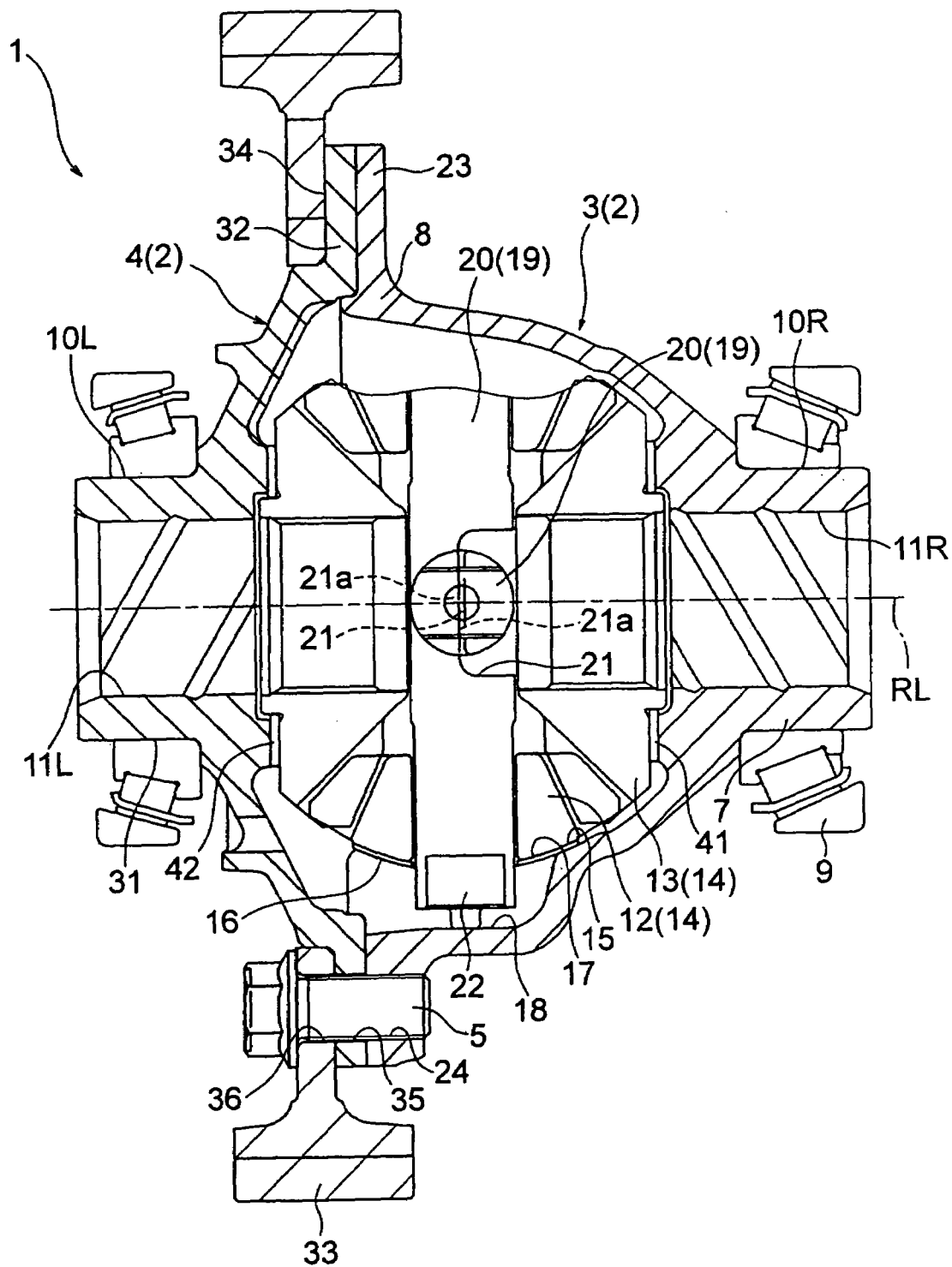
FIG. 4 is an enlarged sectional view of a main part of the differential of FIG. 3 being assembled.

The case 3 is made up of a small-diameter part 7 shown on the right of FIG. 3 and a large-diameter part 8 shown on the left of FIG. 3 co-axially formed to be connected to the small-diameter part 7, and is shaped to be substantially stepped cylindrical as a whole. A journal portion 10R of a pair of journal portions 10R and 10L used to rotatably support the differential case 2 on a housing (e.g., a mission case of the transmission), not shown, through a bearing 9 shown in FIG. 4 is formed on the outer peripheral surface of the small-diameter part 7 of the case 3. As in a conventional device, a shaft through-hole 11R is formed inside the journal portion 10R. The shaft through-hole 11R is bored in the axial direction through which the proximal end, for example, of a right wheel driving shaft, which is one of the right and left wheel driving shafts, can be inserted. The axis center of the shaft through-hole 11R is formed to coincide with the rotational axis center RL of the differential case 2.

A gear-mounting hole 15 is formed inside the large-diameter part 8 of the case 3. The gear-mounting hole 15 can mount four pinions 12 and one side gear 13 shown on the right of FIG. 3 of a differential gear 14 including the four pinions 12 and a pair of side gears 13 in its interior. The gear-mounting hole 15 has a spherical surface 17 formed by a curvature radius at which the outer peripheral surface of the pinion 12 can slide through a spherical-surface sliding bearing 16.

In other words, the spherical-surface sliding bearing 16 that is used also as a spacer is disposed between mutually opposite surfaces of the case 3 and the four pinions 12, in greater detail, between the back surfaces of the four pinions 12 and the spherical surface 17 of the gear-mounting hole 15 of the case 3 that faces these back surfaces.

Figure 5:
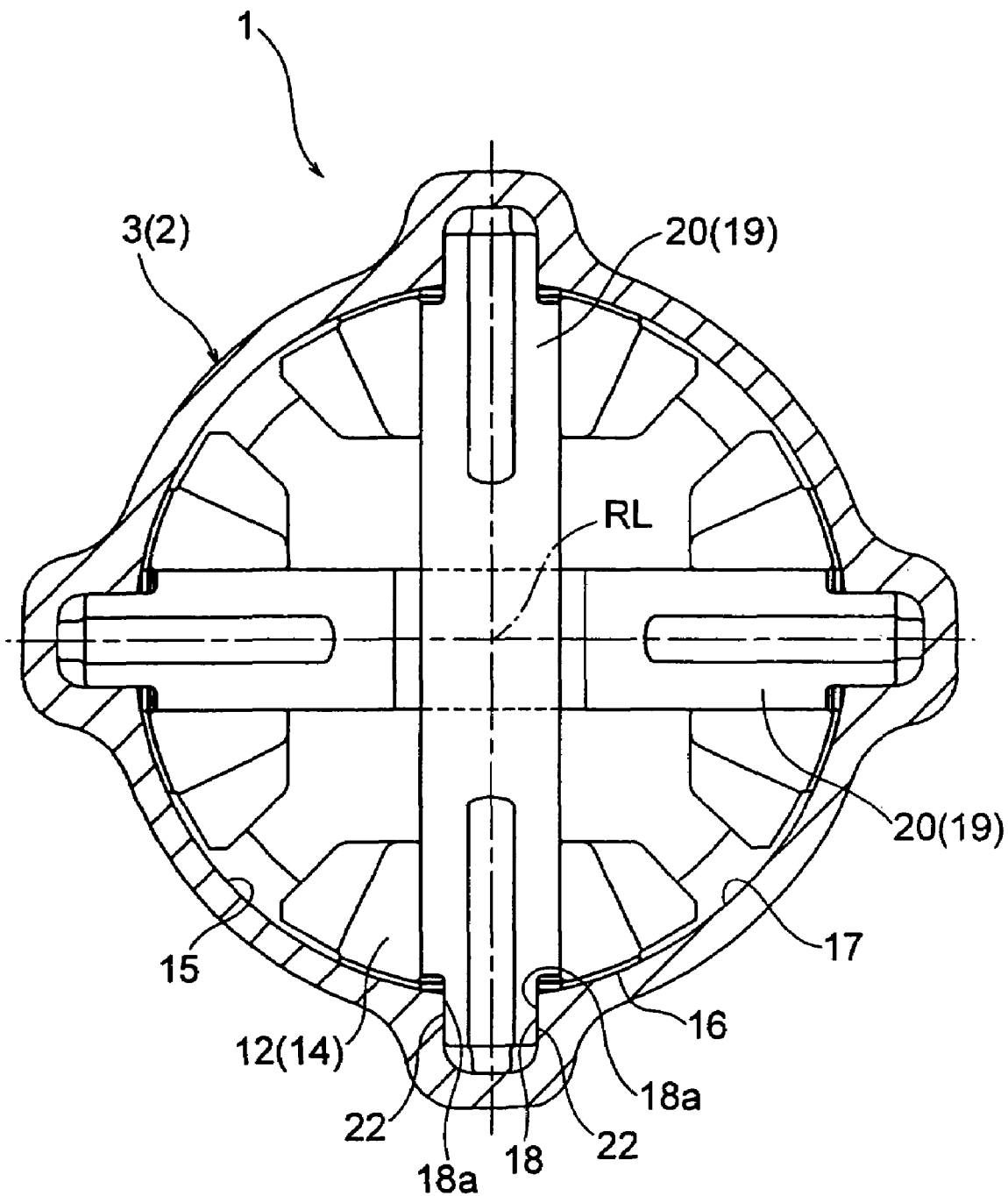
FIG. 5 is a left sectional view that shows a pinion shaft attached to the case of the differential of FIG. 3.

Four shaft-mounting grooves 18 are formed in the inner peripheral surface of the gear-mounting hole 15 at four places in total, i.e., at both inner peripheral surfaces in the upward and downward directions shown at the upper and lower parts of FIG. 5 and both inner peripheral surfaces in the rightward and leftward directions shown at the right and left parts of FIG. 5. The four shaft-mounting grooves 18 are extended in the axial direction of the gear-mounting hole 15, i.e., in the rightward and leftward directions of FIG. 4 and are opened toward the large-diameter open end of the gear-mounting hole 15 situated on the left of FIG. 3 so that the four shaft-mounting grooves 18 can face each other in the upward and downward directions and in the rightward and leftward directions, respectively.

In other words, the four shaft-mounting grooves 18 are equi-angularly provided at angles of 90 degrees in the inner peripheral surface on the side of the large-diameter part 8 of the case 3 centering on the rotational axis center RL so that the distance between adjoining ones becomes equal at the same distance. As shown in FIG. 4, a pair of inner surfaces 18a that face the shaft-mounting grooves 18 are formed substantially in parallel with each other.

As shown in FIG. 5, the four pinions 12 are rotatably mounted slightly apart from the four ends of the cross-shaped pinion shaft 19 toward the center. This pinion shaft 19 is formed by arranging two straight pinion shafts 20, which are identical to each other in shape, like a cross. The two straight pinion shafts 20 may be different in shape from each other.

As shown in FIG. 3, the straight pinion shaft 20 has a substantially cylindrical shape as a whole. A concave engagement portion 21 is formed in the middle of the shaft 20 in its axial direction along a direction perpendicular to the axial direction. Assuming that a direction followed from the outside to the inside, i.e., from the side of the outer periphery to the axis center is a depth direction, the concave engagement portion 21 has a planar bottom face 21a at the axis center. The two straight pinion shafts 20 can be easily cross-shaped by causing the bottom face 21a of the concave engagement portion 21 of one of the straight pinion shafts 20 to face the bottom face 21a of the concave engagement portion 21 of the other straight pinion shaft 20 so as not to come in contact with each other.

Figure 6:
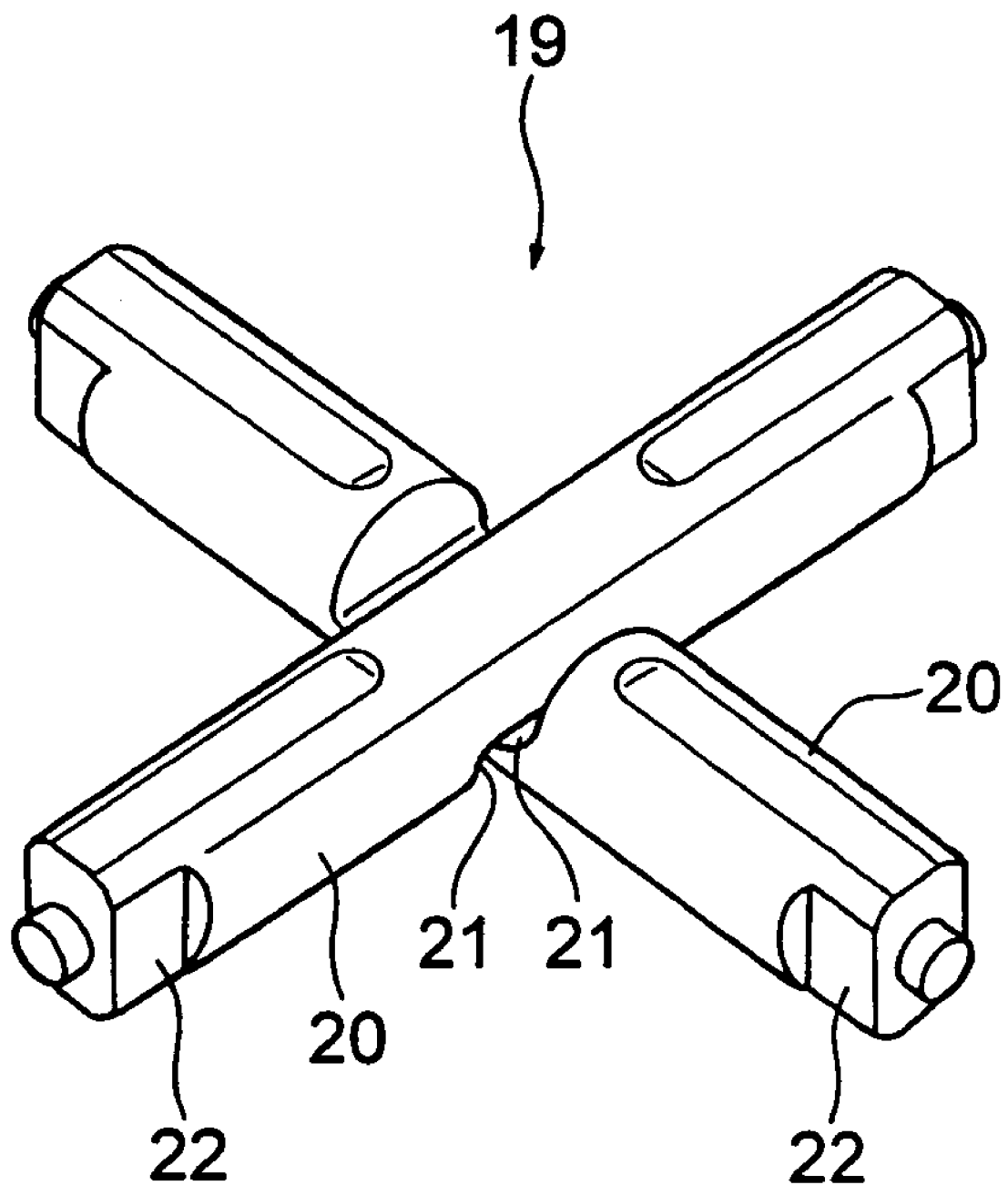
FIG. 6 is a perspective view that shows only the state in which two straight pinion shafts of the differential of FIG. 3 are cross-shaped.

That is, the pinion shaft 19 formed by the cross-shaped two straight pinion shafts 20 can be easily and simply obtained by arranging the two straight pinion shafts 20 so that the bottom faces 21a of the concave engagement portions 21 of the pinion shafts 20 can face each other, as shown in FIG. 6.

An attachment portion 22 having two planes nearly parallel to each other is provided in a direction perpendicular to the bottom face 21a of the concave engagement portion 21 in the vicinity of both ends of the outer peripheral surface of each straight pinion shaft 20. The attachment portion 22 of the straight pinion shaft 20 is inserted from the opening side shown on the left of FIG. 3 of the gear-mounting hole 15 into the shaft-mounting groove 18. Thus, an assembling capability can be improved, and cost reductions can be achieved. The straight pinion shaft 20 can be prevented from rotating upon the axis center by inserting each attachment portion 22 having parallel planes formed at the ends of the straight pinion shaft 20 so as to face the inner surfaces 18a and 18a of the shaft-mounting groove 18. The width of the shaft-mounting groove 18 in the direction in which the two inner surfaces 18a face each other is slightly greater than the distance between the attachment portions 22 of the straight pinion shaft 20. As a result, the straight pinion shaft 20 is movably disposed inside the differential case 2, more specifically, inside the gear-mounting hole 15 of the case 3. A small-diameter projection is co-axially provided at both ends of the straight pinion shaft 20.

One of the pair of side gears 13 that are engaged with the four pinions 12 attached to the pinion shaft 19 is disposed on the side of the bottom shown on the right of FIG. 3 which is one end of the interior of the gear-mounting hole 15 so that its axis center coincides substantially with the rotational axis center RL of the differential case 2.

A wheel driving shaft, not shown, or the proximal end of an output shaft connected to the wheel driving shaft is connected to the inner peripheral surface of the side gear 13 by a coupling means, such as a spline, so that they can be rotated together.

An annular flange portion 23 that extends radially outward is formed on the outer peripheral surface of the open end shown on the left of FIG. 3 of the large-diameter part 8 of the case 3. As shown at only one place of FIG. 4, twelve female screws 24 that penetrate in the thickness direction are equi-angularly disposed on the flange portion 23 so that the center-to-center distance between the two female screws 24 adjoining at the same distance from the rotational axis center RL of the differential case 2 can become even.

The cover 4 is made up of a small-diameter part 31 shown on the left of FIG. 3 and a large-diameter part 32 shown on the right of FIG. 3 co-axially formed to be connected to the small-diameter part 31, and is shaped to be substantially stepped cylindrical as a whole. The journal portion 10L of the pair of journal portions 10R and 10L used to rotatably support the differential case 2 on a housing, not shown, through the bearing 9 is formed on the outer peripheral surface of the small-diameter part 31 shown on the left of FIG. 3 of the cover 4. As in a conventional device, a shaft through-hole 11L is formed inside the journal portion 10L. The shaft through-hole 11L is bored in the axial direction through which the proximal end, for example, of the left wheel driving shaft, which is one of the right and left wheel driving shafts, can be inserted. The axis center of the shaft through-hole 11L is formed to coincide with the rotational axis center RL of the differential case 2. The shaft through-holes 11R and 11L are formed so that their axis centers coincide with each other.

As shown in FIG. 4, an annular ring-gear-mounting groove 34 used to mount a ring gear 33 is formed on the outer-periphery side of the outer surface shown on the left of FIG. 3 of the large-diameter part 32 of the cover 4. Like the female screws 24 of the case 3, twelve through-holes 35 that penetrate in the thickness direction are equi-angularly provided in the ring-gear-mounting groove 34 so as to be parallel to the rotational axis center RL of the differential case 2. Like the female screws 24 of the case 3, twelve screw through-holes 36 that penetrate in the thickness direction are equiangularly provided in the ring gear 33, as shown at only one place of FIG. 4.

The fixing bolt 5, which is inserted into the screw through-hole 36 of the ring gear 33 and into the through-hole 35 of the cover 4 in this order, is screwed into the female screw 24 formed in the flange portion 23 of the case 3, and the open end of the large-diameter part 8 of the case 3 is unitedly closed with the large-diameter part 32 of the cover 4. As a result, the closed differential case 2 can be formed, and the ring gear 33 can be fixed to the differential case 2.

A known fixing member, such as a rivet, not shown, may be used instead of the fixing bolt 5. The number of fixing bolts 5 to be used can be increased or decreased depending on, for example, strength.

Between mutually opposite surfaces of the differential case 2 and the side gears 13, in greater detail, between the back surfaces of the side gears 13 and the inner surface of the differential case 2 that faces the back surfaces thereof, an annular thrust sliding bearing 41 that is used also as a spacer is disposed at one place therebetween shown on the right of FIG. 3, and an annular thrust sliding bearing 42 that is used also as a spacer is disposed at the other place therebetween shown on the left of FIG. 3. The annular thrust sliding bearing 42 used also as a spacer shown on the left of FIG. 3 serves also as a shim that performs a gap adjustment as described later.

Since the other structures are formed in the same way as in the conventional well-known differential, a detailed description thereof is omitted.

Next, a description will be given of the operation of the embodiment having the aforementioned structure.

According to the differential 1 of this embodiment, an improvement in performance can be achieved, i.e., an improvement in durability and a reduction in abnormal noises can be easily and reliably achieved by optimizing the engagement of the differential gear 14.

In greater detail, according to the differential 1 of this embodiment, since the pinion shaft 19 that rotatably holds the pinions 12 is movably disposed in the differential case 2, the pair of side gears 13 and the four pinions 12 can share a backlash evenly, and therefore the backlash can be easily minimized. This makes it possible to even out gaps formed between mutually opposite surfaces of the side gears 13 to which wheel driving shafts are attached and the differential case 2, i.e., gaps formed between the back surfaces of the side gears 13 and the inner surface of the differential case 2 that faces the back surfaces thereof. As a result, since gaps in the axial direction of the pair of wheel driving shafts connected to the side gears 13 can be evened out, the quantity of movement in the axial direction of the pair of wheel driving shafts can be evened out, and the rickety movements of wheels and tires can be evened for the right and left ones, thereby achieving an improvement in the commercial value.

Furthermore, according to the differential 1 of this embodiment, the thrust sliding bearings 41 and 42 are disposed between the differential case 2 and the side gears 13, and the spherical-surface sliding bearing 16 is disposed between the differential case 2 and the pinion 12. Therefore, the friction of sliding resistance between the differential case 2 and the side gears 13 and between the differential case 2 and the pinion 12 can be reduced by these sliding bearings 16, 41, and 42, thus making it possible to easily and reliably achieve an improvement in durability and a reduction in abnormal noises.

Furthermore, according to the differential 1 of this embodiment, since the sliding bearings 16, 41, and 42 are each used also as a spacer, gaps between mutually opposite surfaces at the engagement portions of the four pinions 12 and the pair of side gears 13 can be easily and simultaneously adjusted when assembled. As a result, an assembling capability can be reliably improved.

Furthermore, according to the differential 1 of this embodiment, since the thrust sliding bearing 42 among the sliding bearings 16, 41, and 42 is used also as a shim, gaps between mutually opposite surfaces at the engagement portions of the four pinions 12 and the pair of side gears 13 can be simultaneously and more easily adjusted merely by changing the thickness of the thrust sliding bearing 42 when assembled. As a result, an assembling capability can be improved even more.

In other words, a backlash that results from gaps at the engagement portions between the four pinions 12 and the pair of side gears 13 can be adjusted by selecting one of the thrust sliding bearings 42 differing in thickness. In other words, backlashes at all of the engagement parts between the pinions 12 and the side gears 13 can be simultaneously and collectively adjusted by the simple operation of exchanging only the thrust sliding bearing 42 used also as a spacer and as a shim with another one having a different thickness without changing the spherical-surface sliding bearing 16 and the thrust sliding bearing 41. Since the thrust sliding bearing 42 can be exchanged with another one by detaching the cover 4 from the case 3 at this time, the workability of a gap adjustment is improved greatly.

The assembling capability and the workability of a gap adjustment are improved proportionately as the number of pinions 12 increases to more than two, and a more noticeable effect can be obtained.

Furthermore, according to the differential 1 of this embodiment, since the pinion shaft 19 is freely movably disposed in the differential case 2, the differential gear 14 is automatically aligned in response to the rotation of the differential 1, i.e., in response to the rotation of the differential case 2 so that backlashes at the engagement portions between the pair of side gears 13 and the four pinions 12 are evened out. This makes it possible to lower the processing accuracy when the differential case 2 is processed and improve the assembling capability, and, accordingly, the cost of the differential 1 can be reduced.

According to the differential 1 of this embodiment, the pinion 12 arcuately moves on the spherical surface 17 when the pinion shaft 19 in a free state moves in response to the rotation of the differential case 2. At this time, the pinion 12 inclines within the range of a clearance between the inner diameter of the pinion 12 at the attachment part of the pinion 12 with the pinion shaft 19 and the outer diameter of the pinion shaft 19. However, interference can be reliably prevented from occurring between the inner diameter of the pinion 12 by the slant of the pinion 12 generated by alignment and the outer diameter of the pinion shaft 19 by setting the slant of the pinion 12 generated by a clearance to be greater than the slant of the pinion 12 generated by alignment. As a result, automatic alignment of the pinion 12 is normally operated in the range of movement of the pinion shaft 19.

The structure capable of improving durability and reducing abnormal noises by optimizing the engagement of the differential gear 14 in the differential 1 of this embodiment, i.e., the structure in which the pinion shaft 19 that rotatably holds the pinion 12 is movably disposed in the differential case 2, in which the thrust sliding bearings 41 and 42 are disposed between the differential case 2 and the side gears 13, and in which the spherical-surface sliding bearing 16 is disposed between the differential case 2 and the pinion 12, the structure in which the sliding bearings 16, 41, and 42 are each used also as a spacer, and the structure in which the thrust sliding bearing 42 among the sliding bearings 16, 41, and 42 is used also as a shim can be applied to various conventional differentials, such as a differential having two pinions or a differential not having a closed differential case but an open differential case.

Furthermore, according to the differential 1 of this embodiment, a demand for cost reductions can be satisfied.

In greater detail, according to the differential 1 of this embodiment, the cross-shaped pinion shaft 19 can be easily formed by the simple operation of disposing the bottom faces 21a of the concave engagement portions 21 of the two straight pinion shafts 20 so as to face each other.

Furthermore, according to the differential 1 of this embodiment, since the pinion shaft 19 is formed with the straight pinion shaft 20 that can be easily processed in a short time, the cost of the pinion shaft 19 can be reduced.

In greater detail, if the conventional, unitedly cross-shaped pinion shaft is formed by machining, costs to form such a cross-shaped material are not slight, and high processing accuracy is needed to form the cross shape, and the processing step becomes complex. In contrast, although the pinion shaft 19 of this embodiment necessitates another step when assembled, a rod-like material is efficiently formed into the straight pinion shaft 20 through a simple processing step. Therefore, as a whole, cost reductions can be reliably and easily achieved.

Figure 1:
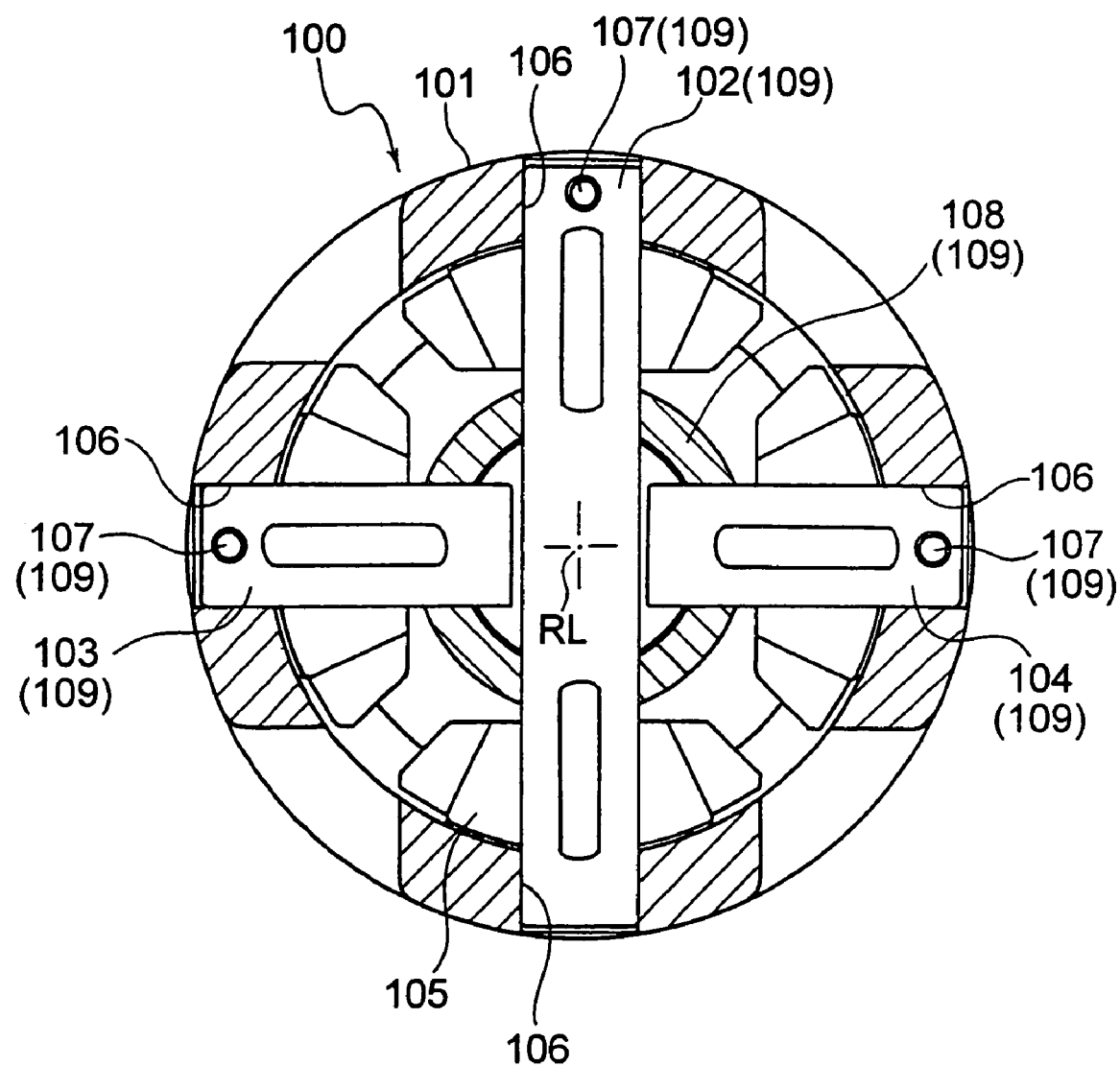
FIG. 1 is a left sectional view that shows a pinion shaft unit attached to a case of a 4-pinion type differential using a conventional pinion shaft unit.
Figure 2:
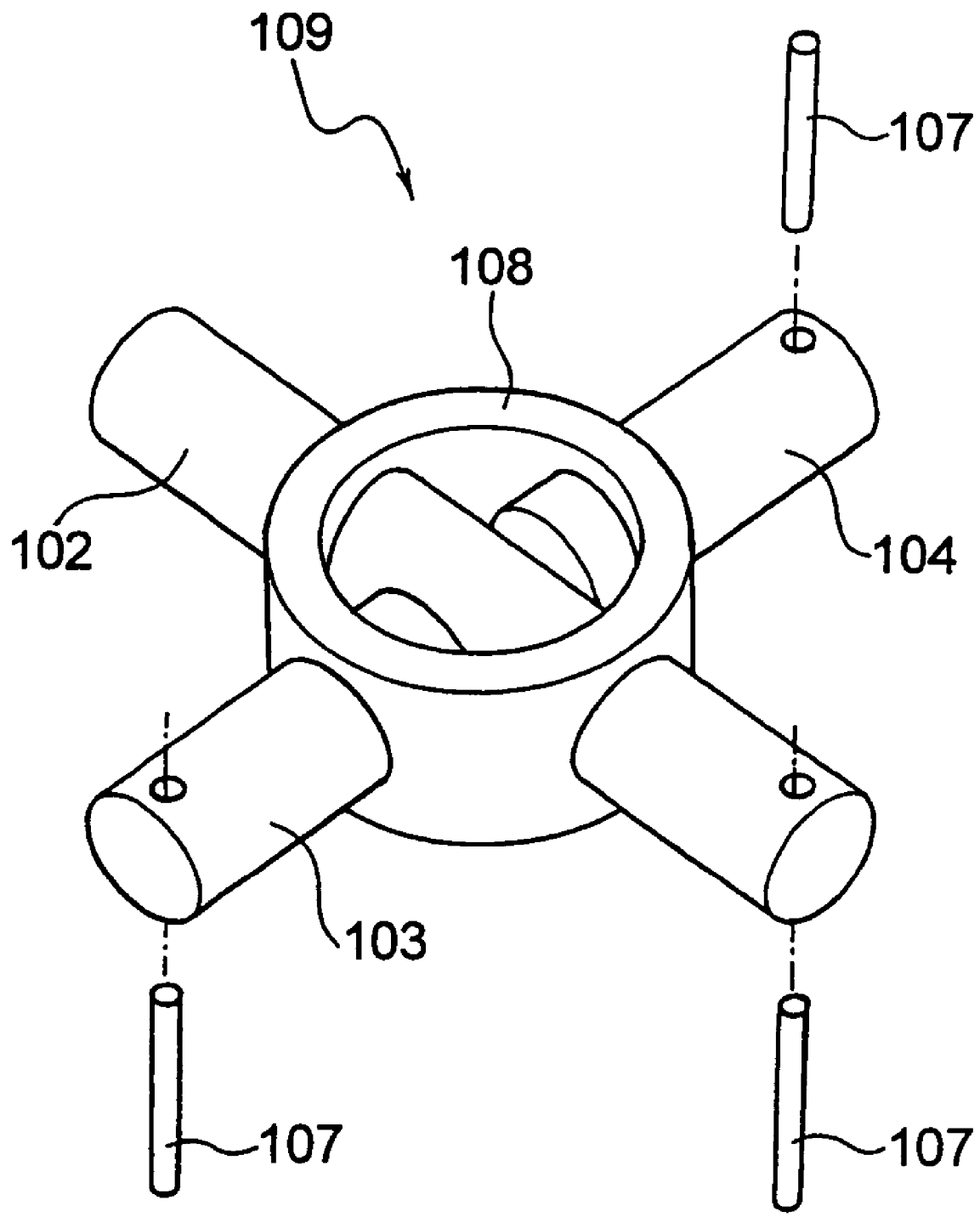
FIG. 2 is a perspective view that shows the structure of the pinion shaft unit of FIG. 1.

When the conventional pinion shaft unit 109 shown in FIG. 1 and FIG. 2 is used, seven components in total, i.e., the three pinion shafts 102, 103, and 104, the three fixing pins 107, and the supporting ring 108 are needed, and many processing steps are added, thus becoming complex. In contrast, in order to construct the pinion shaft 19 of this embodiment, a rod-like material can be efficiently formed into the straight pinion shaft 20 through a simple processing step. Therefore, the number of components is small, and cost reductions can be reliably and easily achieved.

Furthermore, when the conventional pinion shaft unit 109 shown in FIG. 1 and FIG. 2 is used, the number of components is seven, which is relatively large, and the step to assemble the case 101 becomes complex. In contrast, the pinion shaft 19 of this embodiment necessitates the two straight pinion shafts 20 (i.e., the number of components is two), and the step to assemble the differential case 2 is simple. Therefore, cost reductions can be reliably and easily achieved.

Furthermore, the pinion shaft 19 of this embodiment is smaller in the number of components than the conventional pinion shaft unit 109, a weight reduction can be achieved.

Furthermore, according to the differential 1 of this embodiment, since the two straight pinion shafts 20 are identical to each other in shape, the two straight pinion shafts 20 can be used as a common component, and therefore productivity is improved even more. As a result, larger cost reductions can be achieved.

Furthermore, according to the differential 1 of this embodiment, since the straight pinion shaft 20 can be formed by processing a rod-like material, the material can be processed at low cost, and they can be saved in a narrow space.

Furthermore, according to the differential 1 of this embodiment, since the differential case 2 can be formed through a forging process in which steel is used as a material, the number of places to be processed can be reduced, and a weight reduction can be achieved by thinning the differential case 2.

Furthermore, according to the differential 1 of this embodiment, since the pinion shaft 19 can be mounted by laying down both ends of the straight pinion shaft 20 into the shaft-mounting groove 18 from the open end of the case 3, automatic assembly of the differential 1 can be easily performed. At this time, it is important to pre-mount the two pinions 12 and the spherical-surface sliding bearing 16 on each straight pinion shaft 20.

Therefore, according to the differential 1 of this embodiment, a demand to improve the performance of the differential and reduce the cost thereof can be easily satisfied.

Figure 7:
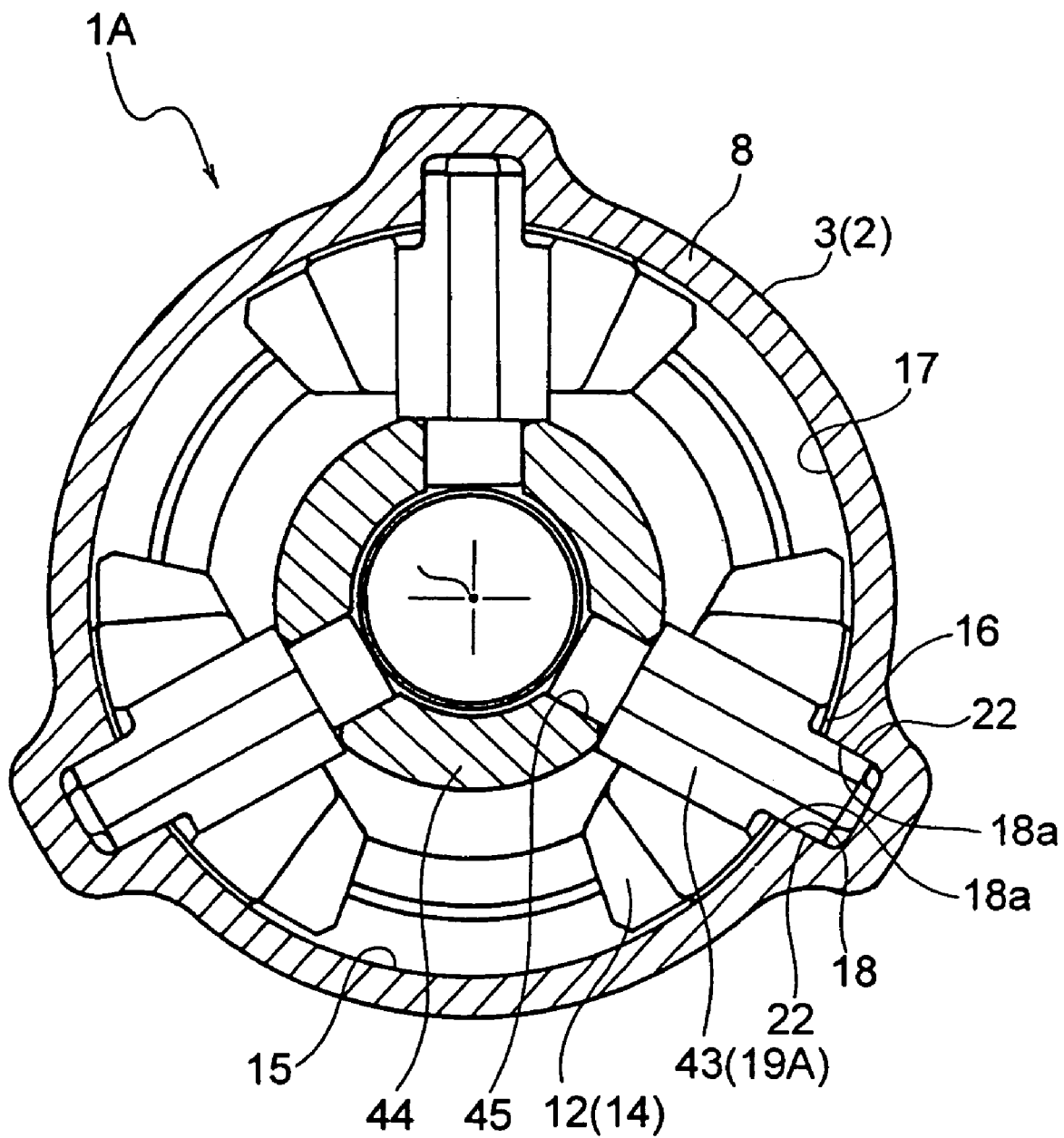
FIG. 7 is a left sectional view that shows a pinion shaft attached to a differential case of a second embodiment of the differential according to the present invention.

Referring now to FIG. 7, a description will be given of a second embodiment of the differential according to the present invention.

FIG. 7 is a left side view that shows a differential gear attached to a case of the second embodiment of the differential according to the present invention.

The differential 1A of this embodiment illustrates a 3-pinion type differential 1A in which the number of pinions 12 is three. Since the basic structure of the differential 1A of this embodiment is the same as that of the differential 1 of the first embodiment described above, only the main part is shown in the figure. Additionally, the same reference symbols are given to the same or equivalent structure as that of the differential 1 of the first embodiment in the figure, and a detailed description thereof is omitted.

As shown in FIG. 7, in the differential 1A of this embodiment, three shaft-mounting grooves 18 are equi-angularly formed in the inner peripheral surface on the side of the large-diameter part 8 of the case 3 of the differential case 2 centering on the rotational axis center RL so that the distance between adjoining ones becomes equal at the same distance. Each of attachment portions 22 formed at ends of the three short straight pinion shafts 43 is inserted into a pair of inner surfaces 18a of the three shaft-mounting grooves 18. Each end of the short straight pinion shaft 43 is shaped like a small-diameter cylinder, and the attachment portions 22 that are planes substantially parallel to each other are formed at the radially outer end shown in FIG. 7. The proximal end on the side of the rotational axis center RL of the short straight pinion shaft 43 is supported by a supporting hole 45 that is formed in an annular supporting ring 44 and that penetrates in the thickness direction. A three-pronged pinion shaft 19A is formed, centering on the rotational axis center RL as a whole, by supporting the three short straight pinion shafts 43 with the three shaft-mounting grooves 18 and the supporting ring 44. The pinion 12 is attached to each of the three short straight pinion shafts 43. The spherical-surface sliding bearing 16 that is used also as a spacer is disposed between mutually opposite surfaces of the case 3 and the three pinions 12, in greater detail, between the back surfaces of the three pinions 12 and the spherical surface 17 of the gear-mounting hole 15 of the case 3 that faces these back surfaces. As shown in FIG. 3 and FIG. 4, the supporting ring 44 is disposed between mutually opposite surfaces of the pair of side gears 13.

Since the other structures are formed in the same way as in the differential 1 of the first embodiment described above, a detailed description thereof is omitted.

Like the differential 1 of the first embodiment, this structure makes it possible to improve the performance of the differential 1A of this embodiment, i.e., this structure makes it possible to easily and reliably achieve an improvement in durability and a reduction in abnormal noises by optimizing the engagement of the differential gear 14.

In greater detail, according to the differential 1A of this embodiment, since the three short straight pinion shafts 43 that rotatably hold the pinions 12 are movably disposed in the differential case 2, the pair of side gears 13 and the three pinions 12 can share a backlash evenly, and therefore the backlash can be easily minimized.

Like the differential 1 of the first embodiment, according to the differential 1A of this embodiment, the thrust sliding bearings 41 and 42 are disposed between the differential case 2 and the side gears 13, and the spherical-surface sliding bearing 16 is disposed between the differential case 2 and the pinion 12. Therefore, the friction of sliding resistance between the differential case 2 and the side gears 13 and between the differential case 2 and the pinion 12 can be reduced by these sliding bearings 16, 41, and 42, thus making it possible to easily and reliably achieve an improvement in durability and a reduction in abnormal noises.

Furthermore, like the differential 1 of the first embodiment, according to the differential 1A of this embodiment, since the sliding bearings 16, 41, and 42 are each used also as a spacer, gaps between mutually opposite surfaces at the engagement portions of the three pinions 12 and the pair of side gears 13 can be easily and simultaneously adjusted when assembled. As a result, an assembling capability can be reliably improved.

Furthermore, like the differential 1 of the first embodiment, according to the differential 1A of this embodiment, since the thrust sliding bearing 42 among the sliding bearings 16, 41, and 42 is used also as a shim, gaps between mutually opposite surfaces at the engagement portions of the three pinions 12 and the pair of side gears 13 can be simultaneously and more easily adjusted merely by changing the thickness of the thrust sliding bearing 42 when assembled. As a result, an assembling capability can be improved even more.

In other words, a backlash that results from gaps at the engagement portions between the three pinions 12 and the pair of side gears 13 can be adjusted by selecting one of the thrust sliding bearings 42 differing in thickness. In other words, backlashes at all of the engagement parts between the pinions 12 and the side gears 13 can be simultaneously and collectively adjusted by the simple operation of exchanging only the thrust sliding bearing 42 used also as a spacer and as a shim with another one having different thicknesses without changing the spherical-surface sliding bearing 16 and the thrust sliding bearing 41. Since the thrust sliding bearing 42 can be exchanged with another one by detaching the cover 4 from the case 3 at this time, the workability of a gap adjustment is improved greatly.

Furthermore, according to the differential 1A of this embodiment, since the pinion shaft 19A (more specifically, the three short straight pinion shafts 43) is freely movably disposed in the differential case 2, the differential gear 14 is automatically aligned in response to the rotation of the differential 1A, i.e., in response to the rotation of the differential case 2 so that backlashes at the engagement portions between the pair of side gears 13 and the three pinions 12 are evened out. This makes it possible to lower the processing accuracy required when the differential case 2 is processed and to improve the assembling capability, and, accordingly, the cost of the differential 1A can be reduced.

According to the differential 1A of this embodiment, the pinion 12 arcuately moves on the spherical surface 17 when the pinion shaft 19A (more specifically, the three short straight pinion shafts 43) in a free state moves in response to the rotation of the differential case 2. At this time, the pinion 12 inclines within the range of a clearance between the inner diameter of the pinion 12 at the attachment part of the pinion 12 with the short straight pinion shaft 43 and the outer diameter of the short straight pinion shaft 43. However, interference can be reliably prevented from occurring between the inner diameter of the pinion 12 by the slant of the pinion 12 generated by alignment and the outer diameter of the short straight pinion shaft 43 by setting the slant of the pinion 12 generated by a clearance to be greater than the slant of the pinion 12 generated by alignment. As a result, automatic alignment of the pinion 12 is normally operated in the range of movement of the short straight pinion shaft 43.

Figure 8:
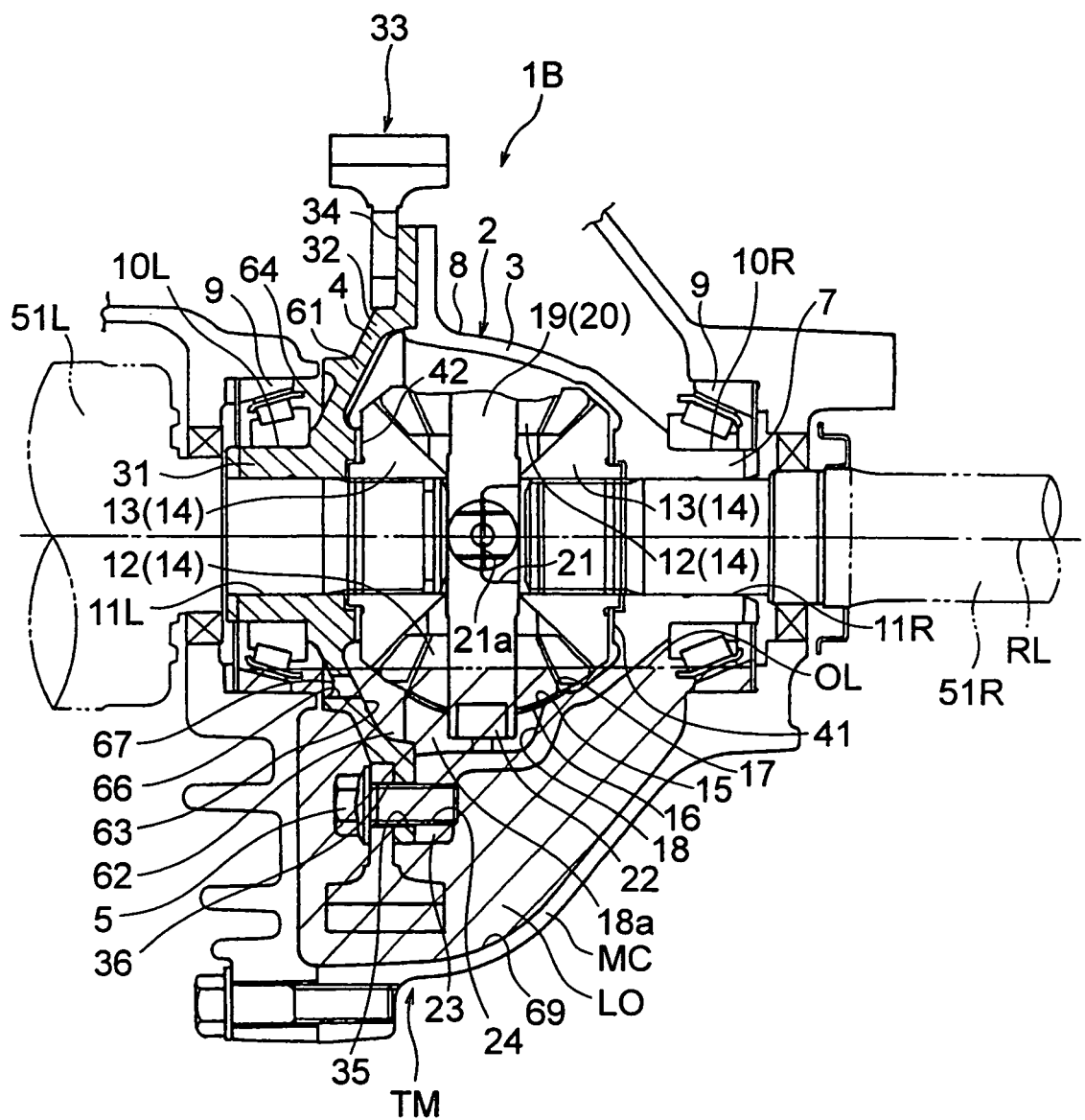
FIG. 8 is a sectional view of a main part of a third embodiment of the differential according to the present invention.
Figure 9:
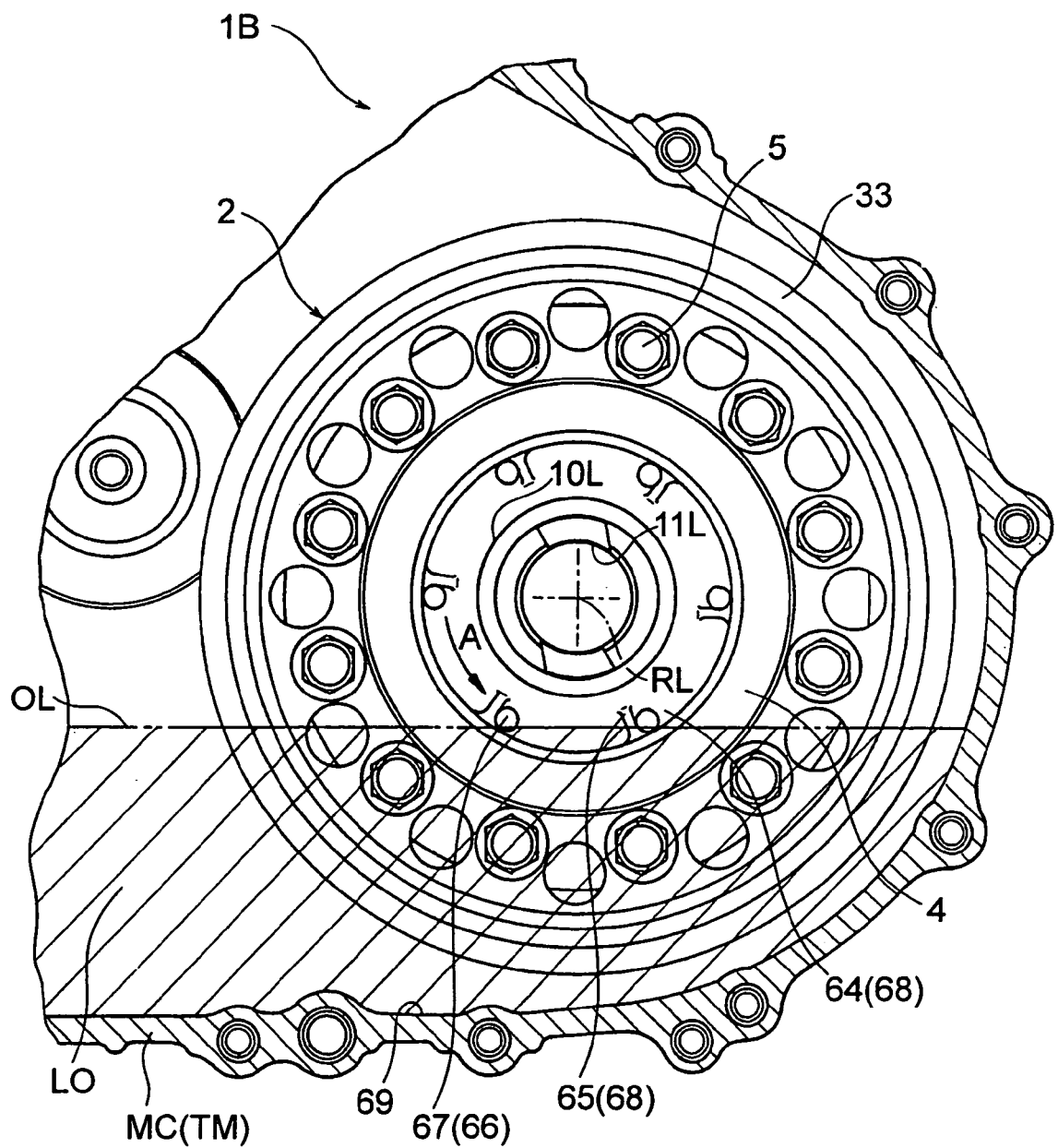
FIG. 9 is a left side view in which the differential case of FIG. 8 is rotated.

Referring now to FIG. 8 and FIG. 9, a description will be given of a third embodiment of the differential according to the present invention.

FIG. 8 and FIG. 9 each show the third embodiment of the differential according to the present invention; FIG. 8 is a sectional view of a main part of the differential, and FIG. 9 is a left side view of a differential case.

The differential 1B of this embodiment is used in an FF type driving-force transmission apparatus. Since the basic structure of the differential 1B of this embodiment is the same as that of the differential 1 of the first embodiment described above, only the main part is shown in the figure. The same reference symbols are given to the same or equivalent structure as that of the differential 1 of the first embodiment, and a detailed description thereof is omitted.

As shown in FIG. 8 and FIG. 9, the differential 1B of this embodiment has a closed differential case 2. The differential case 2 can be separated into two parts, i.e., a case 3 shown on the right of FIG. 8 and a cover 4 shown on the left of FIG. 8. That is, the differential case 2 is separated into the right and left parts along the rotational axis center RL. The differential case 2 can bring its interior into a closed state by fastening the cover 4 to the case 3 with a fixing bolt 5.

As shown in FIG. 8, the differential case 2 is rotatably disposed in a mission case MC of a transmission TM used as a housing through a pair of bearings 9. One of various ball bearings can be selected as the bearing 9 according to the need of, for example, a design concept. A conical roller bearing is used in this embodiment.

A journal portion 10R, which is one of a pair of journal portions 10R and 10L used to rotatably support the differential case 2 on the mission case MC through a bearing 9, is formed on the outer peripheral surface of the small-diameter part 7 of the case 3 of the differential case 2. Inside the journal portion 10R, a shaft through-hole 11R is bored in the axial direction through which the proximal end, for example, of a right wheel driving shaft 51R, which is one of the right and left wheel driving shafts, can be inserted. The axis center of the shaft through-hole 11R is formed to coincide with the rotational axis center RL of the differential case 2.

The cover 4 is made up of a small-diameter part 31 shown on the left of FIG. 8 and a large-diameter part 32 shown on the right of FIG. 8 co-axially formed to be connected to the small-diameter part 31, and is shaped to be substantially stepped cylindrical as a whole. The journal portion 10L, which is the other one of the pair of journal portions 10R and 10L used to rotatably support the differential case 2 on the mission case MC through the bearing 9, is formed on the outer peripheral surface of the small-diameter part 31 shown on the left of FIG. 8 of the cover 4 in such a way as to protrude in the axial direction. As in a conventional device, a shaft through-hole 11L is formed inside the journal portion 10L. The shaft through-hole 11L is bored in the axial direction through which the proximal end, for example, of the left wheel driving shaft 51L, which is the other one of the right and left wheel driving shafts, can be inserted. The axis center of the shaft through-hole 11L is formed to coincide with the rotational axis center RL of the differential case 2. The shaft through-holes 11R and 11L are formed so that their axis centers coincide with each other.

A concave surface 63 is formed in the inner surface of a connecting portion 61 used to connect the large-diameter part 32 and the small-diameter part 31 of the cover 4 together which is situated on the side of the opening shown on the right of FIG. 8 between the engagement portions of the four pinions 12 and the side gears 13 that constitute the differential gear 14 shown on the left of FIG. 8. The concave surface 63 can form a space 62 that functions as an oil reservoir that can store a lubricant supplied into the differential case 2 in the interior of the differential case 2 when the differential case 2 is rotated.

A concave portion 64 is formed in the outer surface shown on the left of FIG. 8 of the connecting portion 61 that connects the large-diameter part 32 and the small-diameter part 31 of the cover 4 together. The concave portion 64 in this embodiment is an annular concave portion, assuming that the direction substantially parallel to the rotational axis center RL of the differential case 2 is a depth direction. The end surface shown on the left of FIG. 8 of an outer peripheral wall situated radially outside the concave portion 64 shaped like an annular concave portion is disposed with an interval so as to face the side face of the outer race of the bearing 9. The end surface shown on the left of FIG. 8 of the inner peripheral wall of the annular concave portion is used for the positioning in the axial direction of a position where the bearing 9 is attached, while being in contact with the side face of the inner race of the bearing 9.

As shown in FIG. 9, a plurality of divided ribs 65, i.e., six divided ribs 65 in this embodiment, obtained by dividing the concave portion 64 into a plurality of parts, i.e., into six parts in this embodiment, centering on the rotational axis center RL of the differential case 2 are radially disposed in the interior of the concave portion 64. A lubrication-side opening 67 of a lubricant supply hole 66 that penetrates the outer and inner surfaces of the cover 4, i.e., the inside and outside of the differential case 2 is formed in the bottom of each concave portion 64 divided into six parts. These six lubricant supply holes 66 are formed so that the axis center becomes parallel to the rotational axis center RL of the differential case 2. The lubricant supply hole 66 can be straightened or tapered according to the need of, for example, a design concept.

The lubrication-side opening 67 shown on the left of FIG. 8 of each lubricant supply hole 66 in this embodiment is formed at a corner of the bottom of the concave portion 64 shown by arrow "A" in FIG. 9, which is situated on the side of the tail of the rotational direction of the differential case 2 when a vehicle travels forward and which is situated on the side of the inner surface of the outer peripheral wall of the concave portion 64. Therefore, the strength of the differential case 2 is lowered only slightly.

In other words, the differential case 2 of this embodiment is constructed so that each lubricant supply hole 66 never affects the strength of the differential case 2.

It is permissible to add the lubricant supply hole 66 at a symmetric position with the divided rib 65 therebetween.

The concave portion 64 and the divided rib 65 constitute a lubricant catching means 68 for guiding a lubricant to each lubricant supply hole 66, i.e., to the lubrication-side opening 67 by catching a lubricant when the differential case 2, which is formed in the vicinity of the position of each lubricant supply hole 66 of the outer peripheral surface of the differential case 2 of this embodiment, is rotated.

The lubricant supply hole 66 and the lubricant catching means 68 may be disposed on the side of the bearing 9 shown on the right of FIG. 8, i.e., may be disposed on the outer peripheral surface of the case 3 shown on the right of FIG. 8 of the differential case 2. It is preferable to form the bottom of the concave portion 64 so that the part where the lubricant supply hole 66 is formed can reach the deepest level, from the viewpoint that a lubricant LO caught in the concave portion 64 can be smoothly guided to the lubricant supply hole 66.

The lubricant supply hole 66 of FIG. 8 shows a state in which one of the six lubricant supply holes 66 stops directly below the rotational axis center RL of the differential case 2 in the vertical direction. The lubricant supply hole 66 of FIG. 9 shows a state in which two lubricant supply holes 66 of the six lubricant supply holes 66 stop at positions differing from that of FIG. 8, more specifically, two lubricant supply holes 66 of the six lubricant supply holes 66 stop at positions rightward and leftward deviating from a position directly below the rotational axis center RL of the differential case 2 in the vertical direction, and positions where a virtual line connecting the centers of the two lubricant supply holes 66 becomes horizontal, i.e., positions above the lubricant supply hole 66 of FIG. 8 in the height direction.

A reserve portion 69 for a lubricant LO supplied into the differential case 2 is formed below the position where the differential 1B in the mission case MC is disposed. In the reserve portion 69, at least a part of the lubrication-side opening 67 of a lubricant supply hole 66, which is situated at the lowest position, of the plurality of lubricant supply holes 66 of the differential case 2 is disposed to face the lubricant LO.

That is, the position of the lubricant supply hole 66 is determined according to the position of an oil surface OL that depends on the quantity of the lubricant LO to be stored in the mission case MC.

As shown in FIG. 8, in this embodiment, when one of the six lubricant supply holes 66 is situated directly below the rotational axis center RL of the differential case 2 in the vertical direction, all of the lubrication-side openings 67 of the lubricant supply holes 66 are situated below the oil surface of the lubricant LO shown by the area of the oblique line from the upper right to the lower left of FIG. 8, and all of the lubrication-side openings 67 face the lubricant LO. When two of the six lubricant supply holes 66 stop at positions rightward and leftward deviating from a position directly below the rotational axis center RL of the differential case 2 and at positions where a virtual line connecting the centers thereof becomes horizontal as shown in FIG. 9, a part of each lubrication-side opening 67 of the two lubricant supply holes 66 faces the lubricant LO shown by the area of the oblique line from the upper right to the lower left of FIG. 9. By this structure, at least a part of the lubrication-side openings 67 of the lubricant supply holes 66, which are situated at the lowest position, of the plurality of lubricant supply holes 66 of the differential case 2 can face the lubricant LO.

In this embodiment, the state where the differential case 2 stops rotating indicates both a state where a vehicle is stopped and a state where an energy conversion machine has not yet driven. The state where a vehicle is stopped is a state where the differential case 2 stops while driving the energy conversion machine. The state where the energy conversion machine has not yet driven is a state where the differential case 2 stops while stopping the energy conversion machine.

In this embodiment, the internal structure of the differential case 2 may be formed in the same way as that of the first embodiment or that of the second embodiment, or may be selected from among various structures, such as a structure in which the number of known conventional pinions is two or more (two, three, four, and so on).

Since the other structures are identical to those of the first embodiment, a detailed description thereof is omitted.

Next, a description will be given of the operation of this embodiment structured as above.

According to the differential 1B of this embodiment, since the lubricant LO can be easily and simply supplied into the differential case 2 with a simple structure when the differential case 2 stops rotating, high performance can be achieved, in other words, an improvement in lubricity can be easily and reliably achieved.

In greater detail, according to the differential 1B of this embodiment, when the differential case 2 stops rotating in a state in which the vehicle stops and the differential case 2 stops rotating, a lubricant LO is reserved in the reserve portion 69 of the mission case MC in the area of the oblique line from the upper right to the lower left of FIG. 8 and FIG. 9. Therefore, a part below the bearing 9 and below the oil surface OL of the lubricant LO of the differential 1B is kept in an oil bath lubrication state. Since the oil surface OL of the lubricant LO is situated at a conical roller situated at the lowest part of the bearing 9 shown at the lower part of FIG. 8 and at a position where the lubrication-side opening 67 of at least one lubricant supply hole 66, which is situated at the lowest level, of the six lubricant supply holes 66 or is situated above the lubrication-side opening 67 as shown in FIG. 8 at this time, the lubricant LO can freely move in the reserve portion 69 and in the differential case 2 through the lubricant supply hole 66. As a result, the lubricant LO in the reserve portion 69 is supplied into the differential case 2 through the lubricant supply hole 66 if the quantity of the lubricant LO kept in the differential case 2 is small. Thus, the quantity of the lubricant LO in the differential case 2 is kept to have a proper quantity. If the lubricant LO stored in the differential case 2 has deteriorated because of long-time, continuous traveling before being stopped so that the viscosity of the lubricant LO has risen, dilution is performed with a lubricant LO supplied into the differential case 2 through the lubricant supply hole 66, and the lubricant LO in the reserve portion 69 is diffused through the lubricant supply hole 66. Therefore, the lubricant LO in the differential case 2 can recover to a proper state. At this time, a portion of the wear-out powder that exists in the differential case 2 can be discharged outward from the differential case 2 as the lubricant LO flows.

Since the quantity of the lubricant LO in the differential case 2 is always kept in a proper state when the vehicle starts, the lubrication of the sliding portion of the differential 1B can be excellently performed.

When the vehicle is traveling, the bearing 9 and a part of the differential 1B are always kept in the state of being bathed in oil by the lubricant LO reserved in the reserve portion 69, and the lubricant LO is supplied from the gap between the bearing 9 and the concave portion 64 to the interior of the differential case 2 through the lubricant supply hole 66.

That is, since the differential case 2 is rotated upon the rotational axis center RL as shown by arrow "A" in FIG. 9 when the vehicle is traveling, the lubricant LO in the reserve portion 69 and a part of the lubricant LO that has splashed into the mission case MC are caught by the concave portion 64 even if the oil surface OL is lowered. Since the lubricant LO caught by the concave portion 64 so as to be stored in the concave portion 64 flows in the rotational direction of the differential case 2 later than the rotational speed of the differential case 2 because of its mass, the lubricant LO flows in a direction opposite to the rotational direction of the differential case 2 in the concave portion 64. The lubricant LO flowing in the concave portion 64 is blocked from flowing in the rotational direction by the divided rib 65 and is blocked from flowing radially outward by the outer peripheral wall of the concave portion 64. As a result, the lubricant LO in the concave portion 64 gathers at the formation part of the lubricant supply hole 66, then passes through the lubricant supply hole 66 formed in the bottom of the concave portion 64, and is guided into the rotating differential case 2.

Therefore, according to the differential 1B of this embodiment, since a divided rib 65 and the concave portion 64 serving as a lubricant catching means 68 for catching and guiding the lubricant LO to the lubrication-side opening 67 of each lubricant supply hole 66 when the differential case 2 is rotated are provided, the lubricant LO can be easily and smoothly supplied into the differential case 2 when the differential case 2 is rotated.

The lubricant LO that has passed through the lubricant supply hole 66 and has been guided into the differential case 2 flows radially outward in the differential case 2 by a centrifugal force caused by the rotation of the differential case 2 centering on the rotational axis center RL of the differential case 2, and is annularly held at least in the space 62 functioning as an oil reservoir in the rotating differential case 2. The lubricant LO pre-stored in the space 62 is annularly held in the space 62 by a centrifugal force caused by the rotation of the differential case 2. When the quantity of the lubricant LO supplied into the differential case 2 increases so that the oil surface OL of the lubricant LO exceeds the lower end of the lubricant supply hole 66 shown in FIG. 8 upward, i.e., toward the center of the differential case 2, the lubricant LO that has exceeded the lower end backwardly flows from the lubricant supply hole 66 toward the bearing 9 so as to cause an overflow, and flows downward from a gap between the outer race of the bearing 9 and the differential case 2 into the mission case MC. At this time, the lubricant LO stored in the differential case 2 is replaced by another one, and wear-out powder is discharged.

Therefore, according to the differential 1B of this embodiment, the lubricant LO can be easily and reliably held in the differential case 2 when the differential case 2 is rotated, and the lubricant LO can be used circulatingly. Therefore, the lubricant LO stored in the differential case 2 can be prevented from deteriorating. As a result, the function of the differential 1B can reliably maintained for a long time.

Furthermore, according to the differential 1B of this embodiment, since a lubrication path and a device for forcedly supplying a lubricant LO to the bearing 9 and into the differential case 2 are not needed, the structure can be simplified as a whole, and size reductions and cost reductions can be realized. It is permissible to provide a lubrication path and a device for forcedly supplying a lubricant LO to the bearing 9 and into the differential case 2, of course.

Furthermore, according to the differential 1B of this embodiment, since the lubricant catching means 68 is provided, a lubricant LO can be easily and smoothly supplied into the differential case 2 when the differential case 2 is rotated.

Furthermore, according to the differential 1B of this embodiment, since the axis center of the lubricant supply hole 66 is formed to be parallel to the rotational axis center RL, a lubricant LO can be smoothly supplied both when the differential case 2 stops rotating and when the differential case 2 is rotating. In addition, it is possible to easily enlarge the volume of the space 62 that functions as an oil reservoir capable of being held in the differential case 2.

Furthermore, according to the differential 1B of this embodiment, since the lubrication-side opening 67 of the lubricant supply hole 66 is formed to substantially face the side face of the outer race of the bearing 9, a lubricant LO can be easily supplied to the bearing 9 and into the differential case 2 when the differential case 2 stops rotating, and the quantity of the lubricant LO held in the space 62 that functions as an oil reservoir in the differential case 2 can be set to be sufficient to lubricate the sliding portion.

Furthermore, according to the differential 1B of this embodiment, when a mission is mounted on a vehicle, and a lubricant LO is supplied into a mission case MC for the first time, the lubricant LO can be supplied also into the differential case 2. Accordingly, since the lubricant LO comes in contact with the sliding portion situated below the oil surface OL of the interior of the differential case 2, the lubrication of the sliding portion of the differential 1B can be excellently maintained when the vehicle starts for the first time after the lubricant LO is supplied.

The present invention can be applied to various differentials, such as a differential used in an FR type driving-force transmission apparatus.

Additionally, the present invention can be variously changed if necessary, without being limited to the aforementioned embodiments. For example, it is possible to individually use three structural characteristics, i.e., an improvement in performance of the differential by the structure capable of achieving an improvement in durability and a reduction in abnormal noises by optimizing the engagement of the differential gear, a reduction in cost of the differential, and an improvement in performance of the differential by the structure capable of achieving an improvement in lubricity of the differential, or it is possible to use the three structural characteristics by a combination of two or three of them.

What is claimed is:

1. A differential in which a plurality of pinions engaged with a pair of side gears are rotatably held on a pinion shaft in a closed differential case rotated together with a ring gear by a driving force of an energy conversion machine, characterized in that the number of the pinions is three or more,
   the pinion shaft is movably disposed in the differential case,
   sliding bearings are disposed between mutually opposite surfaces of the pair of side gears and the differential case, and between mutually opposite surfaces of the pinions and the differential case, respectively,
   a reserve portion to reserve a lubricant supplied to the interior of the differential case is formed in a housing for said differential case, and
   a plurality of lubricant supply holes communicating with the inside and the outside of the differential case are formed in the outer peripheral surface of the differential case, and at least a part of the lubrication-side openings of the lubricant supply holes that are situated at a lowest part is formed to face a lubricant reserved in the reserve portion when the differential case stops rotating.

2. The differential according to claim 1, in which a lubricant catching means for catching a lubricant and guiding the lubrication to the lubrication-side opening of the lubricant supply bole when the differential case is rotated is provided in a vicinity of positions where a plurality of lubricant supply holes of the outer peripheral surface of the differential case are formed.

* * * * *